United States Patent Office 3,012,869
Patented Dec. 12, 1961

3,012,869
HERBICIDAL METHOD EMPLOYING DINITRO-POLYALKYL BENZENES
David E. Ramey, William J. Hughes, and Johannes Van Overbeek, Modesto, Calif., assignors to Shell Oil Company, a corporation of Delaware
No Drawing. Filed Sept. 8, 1958, Ser. No. 759,445
8 Claims. (Cl. 71—2.3)

The present invention relates to novel herbicidal compositions and is particularly directed to a method for the selective control of noxious grasses, particularly crabgrass. Dinitrobenzene compounds, preferably having alkyl groups substituted thereon, such as dinitro-m-xylenes, constitute the preferred active ingredients of these novel herbicidal compositions. These compounds possess unexpectedly high herbicidal potency against noxious grass weeds, particularly crabgrass, yet exhibit little or no effect on broadleaf plants. This extraordinary specificity for noxious grasses and for crabgrass in particular constitutes one most unexpected and highly desirable property of the compositions of the present invention.

The dinitroaryl compounds particularly contemplated by the present invention are those containing two nitro radicals and preferably two or three alkyl radicals as substitutes for hydrogen atoms on a benzene ring. The most preferred compounds employed in the highly selective herbicidal compositions of the present invention may be defined by reference to the following structural formula:

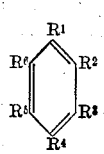

wherein $R^1$ is an alkyl radical; $R^2$ is hydrogen, alkyl, alkylcarbonyl or a nitro radical; $R^3$ and $R^5$ each represent a hydrogen or an alkyl radical; $R^4$ is an alkyl or nitro radical; and $R^6$ is hydrogen, a nitro radical or an alkyl radical. The alkyl substituents may contain 1–10 carbon atoms and are preferably lower alkyl. Two of the substituents must be nitro groups. Of the compounds defined, those containing two nitro groups and two or three alkyl groups on the benzene ring nucleus have been found most desirable. Specific examples of compounds encompassed by the present invention are: 5-tert-butyl-2,4-dinitro-m-xylene; 4,6-dinitro-m-xylene; tert-butyldinitrotoluene; 1 - tert - butyl - 3,4,5-trimethyl-2,6-dinitrobenzene; 4′-tert - butyl-2′,6′ - dimethyl - 3′,5′-dinitroacetophenone; 3-tert-butyl-2,6-dinitro-p-cymene; 1,5-diisopropyl-2,4-dinitrobenzene; 1-sec-decyl-3,4,5-tridecyl-2,6-dinitrobenzene; 4-(1-methylbutyl)-2,6-dinitro-m-xylene; 5-sec-butyl-2,4-dinitro-m-xylene; and 5-sec-decyl-2,4-dinitro-m-xylene.

Compounds of the present invention may be prepared by alkylation of the appropriate aryl and aralkyl compound such as benzene, toluene, xylene, aniline, acetophenone, or cymene in the presence of an alkylation catalyst such as aluminum chloride, followed by nitration in accordance with methods known to those well versed in the art. For example, dinitro-tertiary butyl-para-cymene may be prepared by adding fuming nitric acid, while cooling and continuously stirring to tertiary butyl-para-cymene and pouring the reaction mixture into ice water to form a precipitate which is separated from the liquid and washed with alkaline water.

The following table based on greenhouse tests shows the potency and surprising selectivity of compounds of the present invention toward crabgrass. All tests were conducted under controlled conditions in greenhouse soil.

| Compound | Crabgrass Control | Condition of Corn, Oats, Soybean and Cotton Plants |
|---|---|---|
| 5-tert-butyl-2,4-dinitro-m-xylene | 4 | All plants near normal. |
| 4,6-dinitro-m-xylene | 4 | Do. |
| tert-butyl-dinitrotoluene | 3 | Do. |
| 1-tert-butyl-3,4,5-trimethyl-2,6-dinitrobenzene | 6 | Do. |
| 4′-tert-butyl-2′,6′-dimethyl-3′,5′-dinitroacetophenone | 3 | Corn, soybean and cotton unaffected. |
| 3-tert-butyl-2,6-dinitro-p-cymene | 6 | All plants near normal. |
| 1,5-diisopropyl-2,4-dinitrobenzene | 2 | Do. |
| 4-(1-methylbutyl)-2,6-dinitro-m-xylene | 2 | Do. |
| 5-sec-butyl-2,4-dinitro-m-xylene | 1 | Do. |

The numbers 1–6 represent the comparative effectiveness of the compounds tested in controlling crabgrass. Number 1 represents the most effective and number 6 represents the least effective crabgrass control observed. As evidenced by this table, the compounds of the present invention are highly effective against grasses without adversely affecting dictoyledons such as cotton, oats, etc. Another even more unique property of these compounds is their surprising selectivity between different grasses. For example, it has been discovered that certain of these compounds are highly selective against crabgrass without adversely affecting other grasses. The value in lawn maintenance of herbicides showing such extraordinary selectivity is immediately apparent. 5-tert-butyl-2,4-dinitro-m-xylene; 1-tert-butyl - 3,4,5-trimethyl-2,6-dinitrobenzene; 3-tert-butyl-2,6-dinitro-p-cymene; and 1,5-diisopropyl-2,4-dinitrobenzene are particularly outstanding as crabgrass herbicides.

In another test evidencing the specificity of compounds of the present invention, 5-sec-butyl-2,4-dinitro-m-xylene was tested under identical conditions against crabgrass, corn, oats, cotton and soybeans in pots in the greenhouse, followed by a growth period of 14 days. The following results were observed:

| Rate | | Crabgrass | Oats | Corn | Cotton | Soybean |
|---|---|---|---|---|---|---|
| Mg./Pot | Approx. lb./acre | | | | | |
| 0.5 | 1 | [1]0 | 25 | 50 | 100 | 100 |
| 1 | 2 | 0 | 25 | 50 | 100 | 100 |
| 5 | 10 | 0 | 25 | 50 | 100 | 100 |
| 10 | 20 | 0 | 0 | 10 | 100 | 100 |

[1] 0=complete control; 100=no effect.

The specificity of this dinitro compound to crabgrass as against crop plants is immediately manifest. For example, at a concentration of 0.5 mg. per pot, crabgrass was completely controlled, whereas cotton and soybean were completely unaffected. At a concentration of 10 mg. per pot, crabgrass germination was completely prevented, whereas again cotton and soybean were unaffected.

If desired, the herbicidally active compound of the present invention may be applied by spraying. Spraying may be performed with aqueous emulsions or suspensions of the active agents. If desired, a minor amount of a wetting agent may be added. Particularly suitable wetting agents are the sodium salts of a mixture of secondary heptadecyl sulfates sold commercially under the name of "Teepol" and polyethylene glycol ethers of alkylphenols sold under the trade name of "Triton X-100" and "Triton X-155."

A further form in which the herbicidal compounds of the present invention may be applied consists of solutions of the active ingredients in suitable inert liquid or semi-solid diluents in which the active ingredient is present in molecularly dispersed form. Suitable inert solvents should not be readily flammable, as odorless as possible, and without any toxic effect. They should not be corrosive to the storage vessel. Examples of suitable solvents are high boiling oils, e.g., oils of vegetable origin such as castor oil, etc., and lower boiling solvents with a flash point of at least 30° C., such as ethylene dichloride, acetylene tetrachloride, sorbent naphtha, etc. Mixtures of solvents may also be used. Nonaromatic petroleum oils and xylene are commonly employed. Nonhalogenated hydrocarbons, either saturated or aromatic, are preferred over halogenated hydrocarbons.

Application may also be made in the form of dusts utilizing as the inert vehicle such materials as tricalcium phosphate, precipitated chalk, bentonite, kaolin and kieselguhr. These compounds may also be employed in the form of aerosols.

The concentrations of the compounds employed in the present herbicidal compositions may vary considerably without departing from the scope of the invention. Thus, the active herbicidal compound may be employed in concentrations ranging from less than 1% by weight to more than 50% based upon the total weight of the composition. The concentration of the compound used is dependent upon many factors, including the particular compound utilized, the carrier employed and the methods and conditions of application. A proper resolution of these factors is within the skill of those well versed in the herbicide art.

The compounds of the present invention may be employed alone or in combination with other m-xylene compounds of the present invention. These compounds may also be combined with other herbicidal, fungicidal, insecticidal, or acaricidal materials, the action of which may be either internal or external, with plant nutritives, plant hormones, and the like.

We claim as our invention:

1. A method for the destruction of crabgrass comprising treating the locus of crabgrass infestation with a herbicidally effective amount of dinitropolyalkyl benzene having the following structural formula:

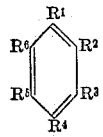

wherein $R^1$ is an alkyl radical containing from 1 to 10 carbon atoms, $R^2$ is selected from the group consisting of hydrogen, alkyl radicals containing from 1 to 10 carbon atoms, and nitro radicals, $R^3$ and $R^5$ are each selected from the group consisting of hydrogen and alkyl radicals containing from 1 to 10 carbon atoms, $R^4$ is selected from the group consisting of alkyl radicals containing from 1 to 10 carbon atoms and nitro radicals, and $R^6$ is selected from the group consisting of hydrogen, alkyl radicals containing from 1 to 10 carbon atoms and nitro radicals, with the proviso that said dinitropolyalkyl benzene contains two and only two nitro radicals always in the meta-position relative to each other.

2. A method for the destruction of crabgrass comprising treating the locus of crabgrass infestation with a herbicidally effective amount of dinitropolyalkyl benzene containing only two nitro radicals always in the meta-position relative to each other and only from 2 to 3 alkyl groups of from 1 to 5 carbon atoms in each alkyl group.

3. A method for the destruction of crabgrass comprising treating the locus of crabgrass infestation with a herbicidally effective amount of dinitroxylene containing two nitro radicals always in the meta-position relative to each other.

4. A method for the destruction of crabgrass comprising treating the locus of crabgrass infestation with a herbicidally effective amount of 5-tert-butyl-2,4-dinitro-m-xylene.

5. A method for the destruction of crabgrass comprising treating the locus of crabgrass infestation with a herbicidally effective amount of 1-tert-butyl-3,4,5-trimethyl-2,6-dinitrobenzene.

6. A method for the destruction of crabgrass comprising treating the locus of crabgrass infestation with a herbicidally effective amount of 1,5-diisopropyl-2,4-dinitrobenzene.

7. A method for the destruction of crabgrass comprising treating the locus of crabgrass infestation with a herbicidally effective amount of 5-sec-butyl-2,4-dinitro-m-xylene.

8. A method for the destruction of crabgrass comprising treating the locus of crabgrass infestation with a herbicidally effective amount of 4-(1-methylbutyl)-2,6-dinitro-m-xylene.

References Cited in the file of this patent
UNITED STATES PATENTS 2,864,871      Morningstar      Dec. 16, 1958

OTHER REFERENCES

Chemical Abstracts, 1919, vol. 13, cols. 960(9) to 961(3).
Chemical Abstracts, 1933, vol. 27, cols. 5062(10) to 5063(10).
Chemical Abstracts, 1947, vol. 41, cols. 416(c) to 417(d).
Chemical Abstracts, 1954, vol. 48, col. 934(d), vol. 48.
Chemical Abstracts, 1955, vol. 49, col. 15148(e); 3041–3045.
Chemical Abstracts, 1956, vol. 50, cols. 214(i) to 215(c).
Plant Regulators, CBCC Positive Data Series, No. 2, June 1955, National Research Council, publ. 384, pages a, b, c, and 44.
Chemical Abstracts, Subject Index A–1, vol. 51, December 1957, page 50s.
Adams in "Chemical Abstracts," vol. 44, 1950, col. 9929(b).
King: "Insecticides and Repellants," U. S. Dept. Agri. Handbook, No. 69, May 1954, pages 39 and 145, 328.
Frear: "Catalogue of Insecticides and Fungicides," vol. 1, 1947, page 46.